(12) United States Patent
Niida et al.

(10) Patent No.: US 9,936,118 B2
(45) Date of Patent: Apr. 3, 2018

(54) IMAGE CAPTURE APPARATUS, INFORMATION PROCESSING APPARATUS, IMAGE CAPTURE SYSTEM, CONTROL METHODS FOR THE SAME, AND PROGRAM

(71) Applicant: CANON KABUSHIKI KAISHA, Tokyo (JP)

(72) Inventors: Mitsuo Niida, Tokyo (JP); Takahiro Iwasaki, Port Washington, NY (US); Toru Nakanishi, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/308,289

(22) PCT Filed: May 13, 2015

(86) PCT No.: PCT/JP2015/064395
§ 371 (c)(1),
(2) Date: Nov. 1, 2016

(87) PCT Pub. No.: WO2015/178403
PCT Pub. Date: Nov. 26, 2015

(65) Prior Publication Data
US 2017/0070661 A1    Mar. 9, 2017

(30) Foreign Application Priority Data

May 20, 2014  (JP) ................................ 2014-104718

(51) Int. Cl.
*H04N 5/232* (2006.01)
*H04N 7/18* (2006.01)

(52) U.S. Cl.
CPC ..... *H04N 5/23206* (2013.01); *H04N 5/23296* (2013.01); *H04N 7/185* (2013.01)

(58) Field of Classification Search
CPC . H04N 5/23206; H04N 5/23296; H04N 7/185
See application file for complete search history.

(56) References Cited

U.S. PATENT DOCUMENTS

| | | | |
|---|---|---|---|
| 6,977,672 B1 * | 12/2005 | Okuno ............. | G08B 13/19656 348/160 |
| 2008/0015017 A1 * | 1/2008 | Ashida ................... | A63F 13/02 463/37 |

(Continued)

FOREIGN PATENT DOCUMENTS

| JP | 2000-341680 A | 12/2000 |
|---|---|---|
| JP | 2003-008973 A | 1/2003 |

(Continued)

OTHER PUBLICATIONS

International Search Report and Written Opinion of the International Searching Authority dated Aug. 11, 2015, issued by WIPO in connection with International Application No. PCT/JP2015/064395.

*Primary Examiner* — Amy Hsu
(74) *Attorney, Agent, or Firm* — Fitzpatrick, Cella, Harper & Scinto

(57) ABSTRACT

An image capture apparatus capable of communicating with an external apparatus via a network has a change unit configured to change an image capture position of image capturing means for capturing an image of an object. In response to a request received from an external apparatus, the image capture apparatus generates a response including a first field in which the operation state of the change unit is described, and sends the generated response to the external apparatus. Here, if the change unit is in initialization, the image capture apparatus generates a response that specifies that the change unit is in initialization using a combination of descriptions in multiple fields, including the first field.

23 Claims, 15 Drawing Sheets

(56) References Cited

U.S. PATENT DOCUMENTS

| | | | |
|---|---|---|---|
| 2010/0017645 A1* | 1/2010 | Kimoto | H04N 5/232 |
| | | | 714/4.1 |
| 2011/0115968 A1* | 5/2011 | Yamanaka | G02B 7/102 |
| | | | 348/357 |
| 2011/0163947 A1* | 7/2011 | Shaw | G06F 3/0346 |
| | | | 345/156 |
| 2013/0120598 A1 | 5/2013 | Iwasaki | 348/207.11 |
| 2013/0329067 A1 | 12/2013 | Niida | 348/211.99 |
| 2015/0036898 A1* | 2/2015 | Cohen | G03B 17/53 |
| | | | 382/126 |

FOREIGN PATENT DOCUMENTS

| | | |
|---|---|---|
| JP | 2013-258538 A | 12/2013 |
| WO | WO 2013/072980 A1 | 5/2013 |
| WO | WO 2015/178401 A1 | 11/2015 |

\* cited by examiner

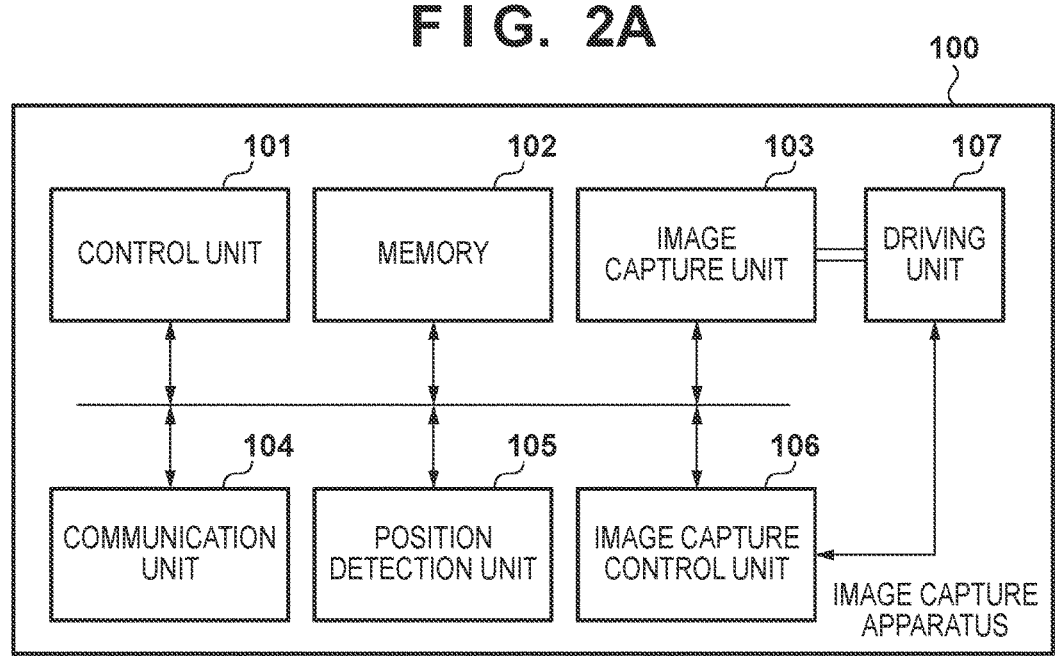
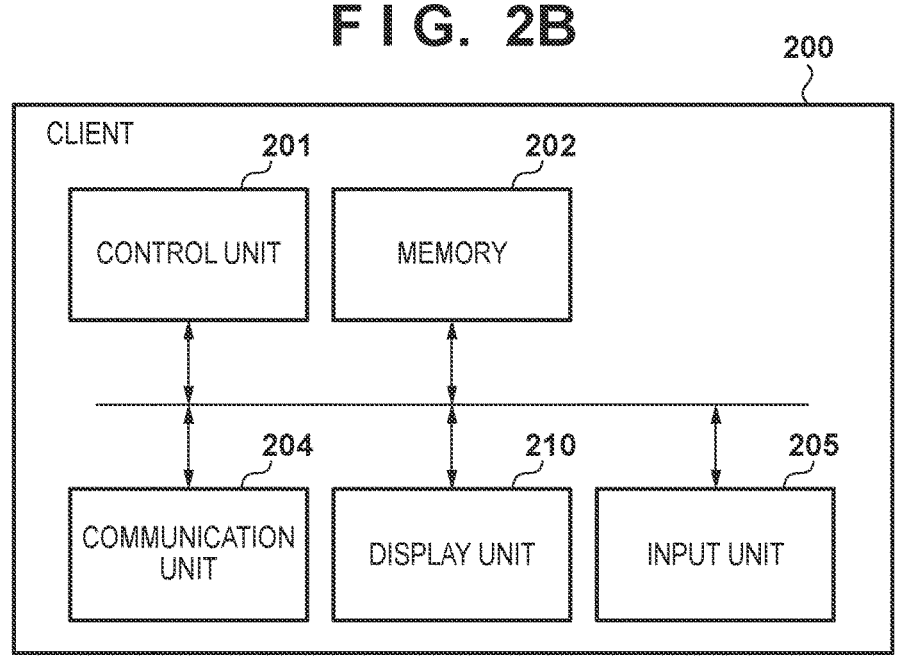

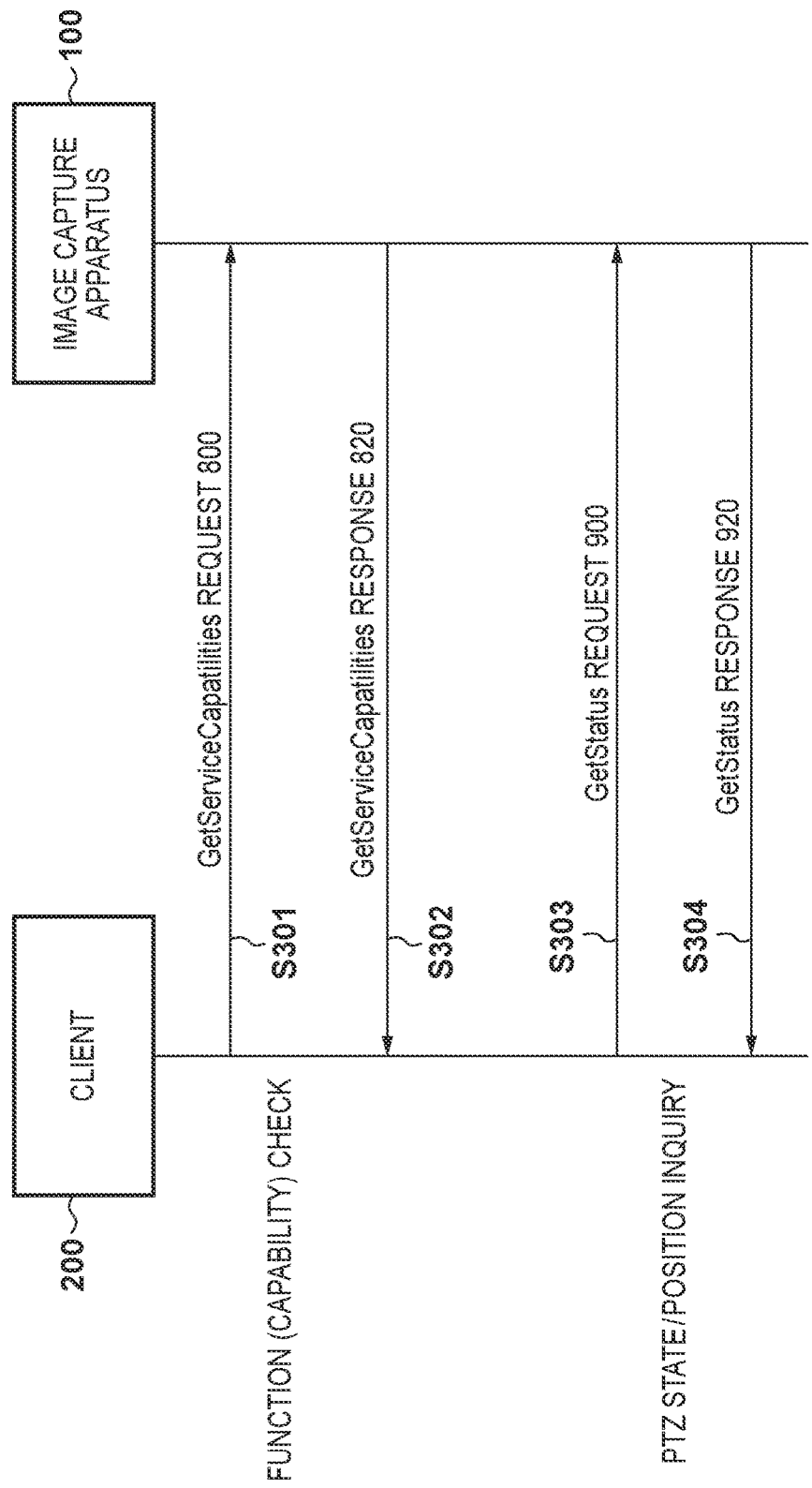

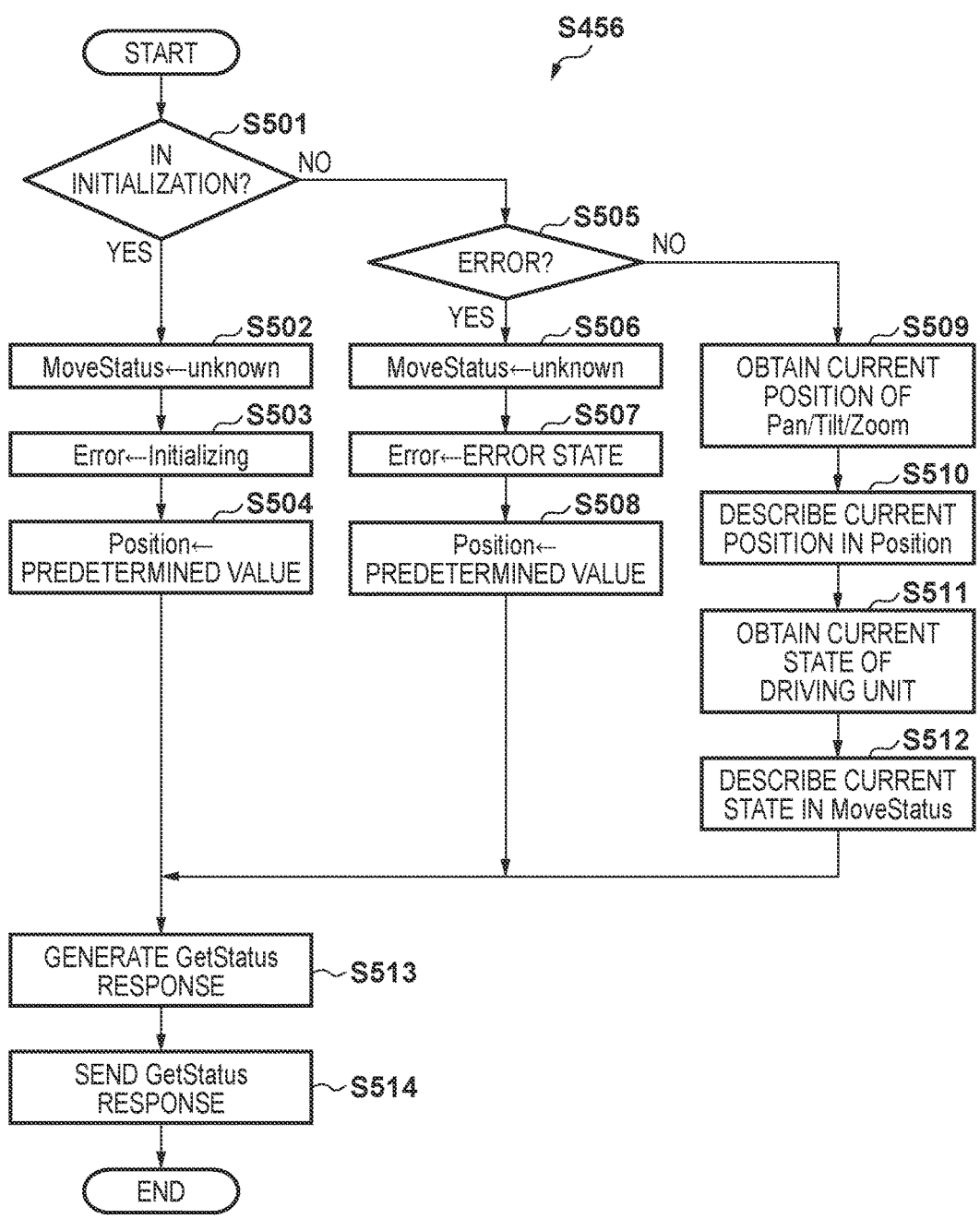

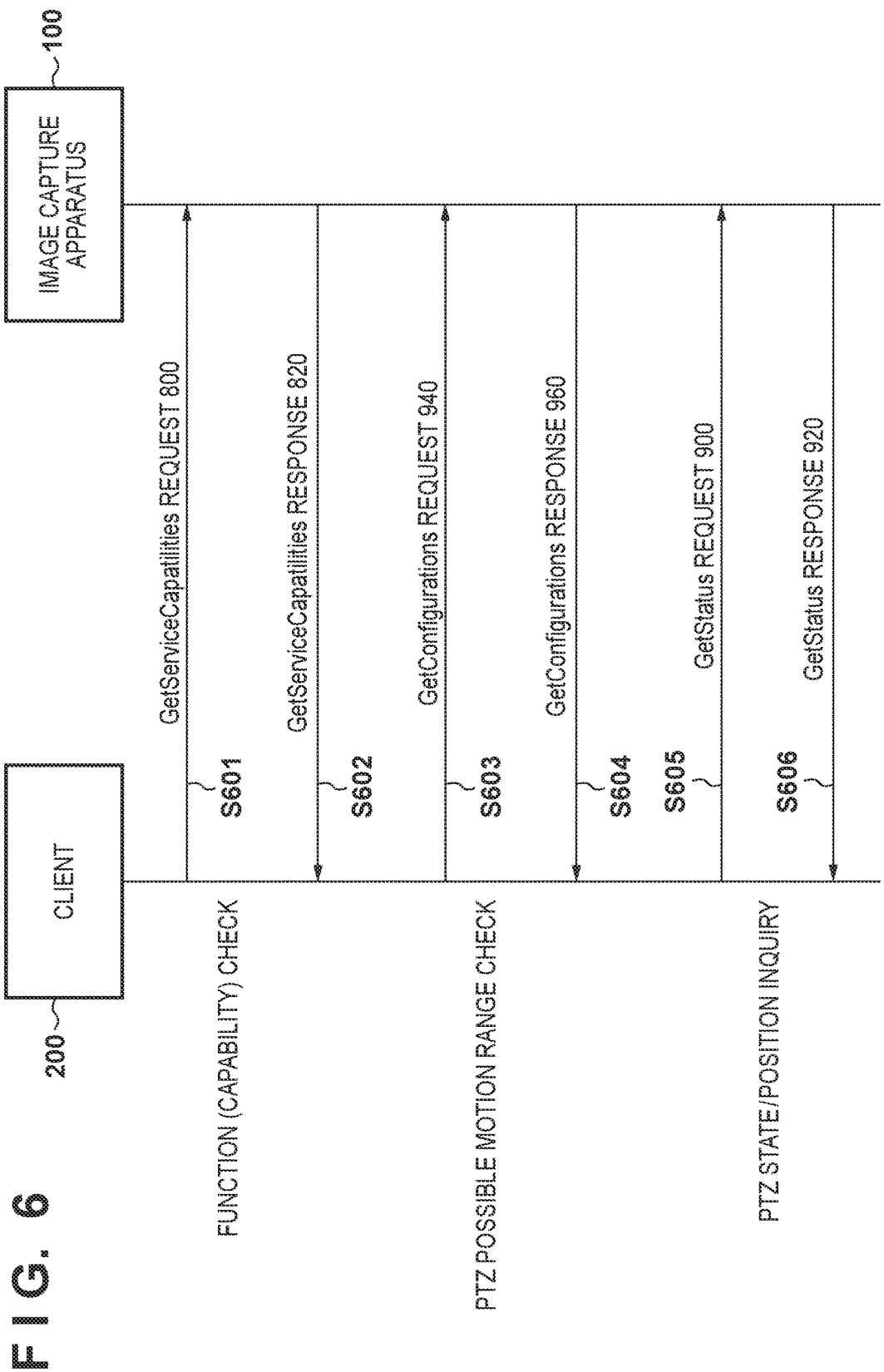

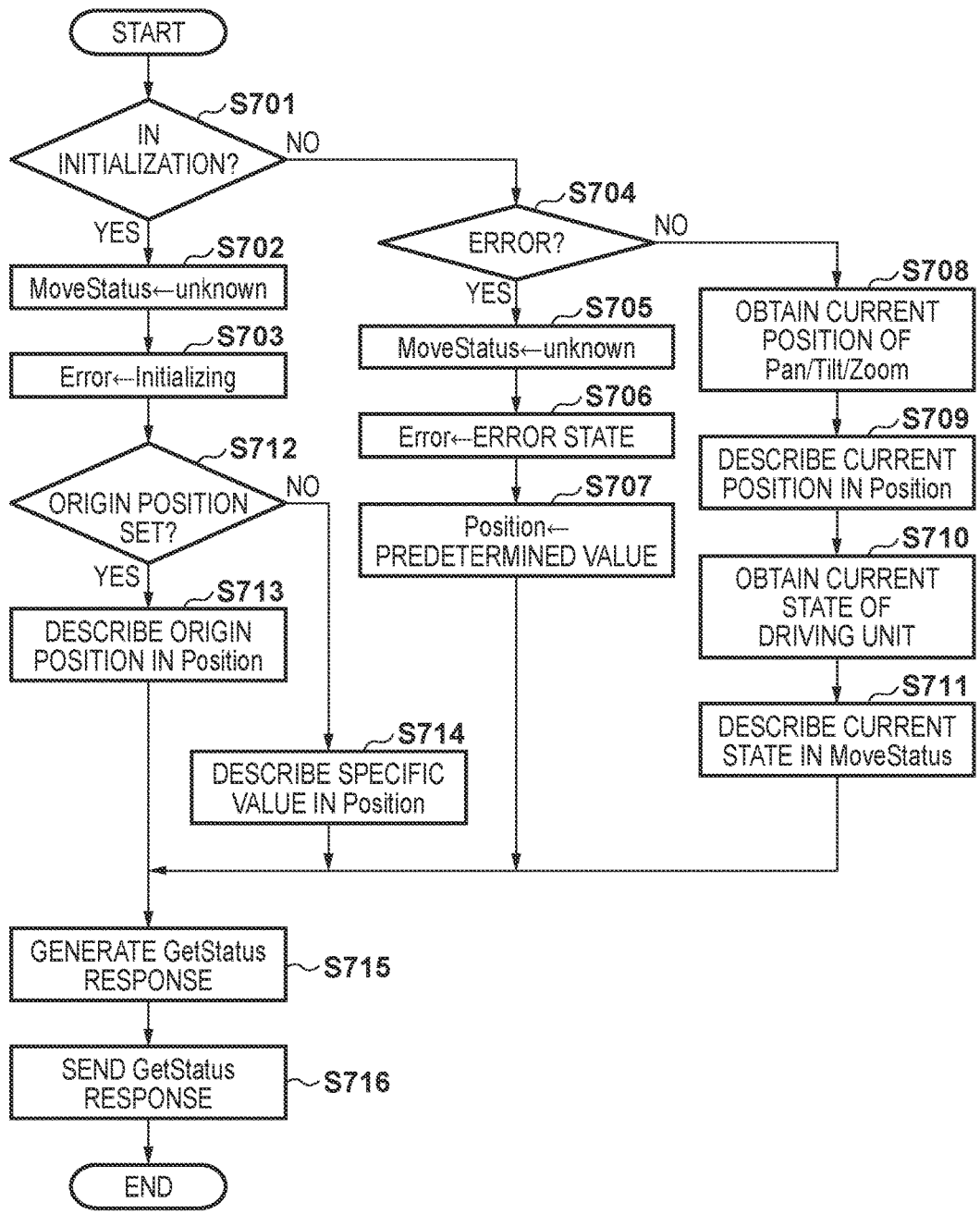

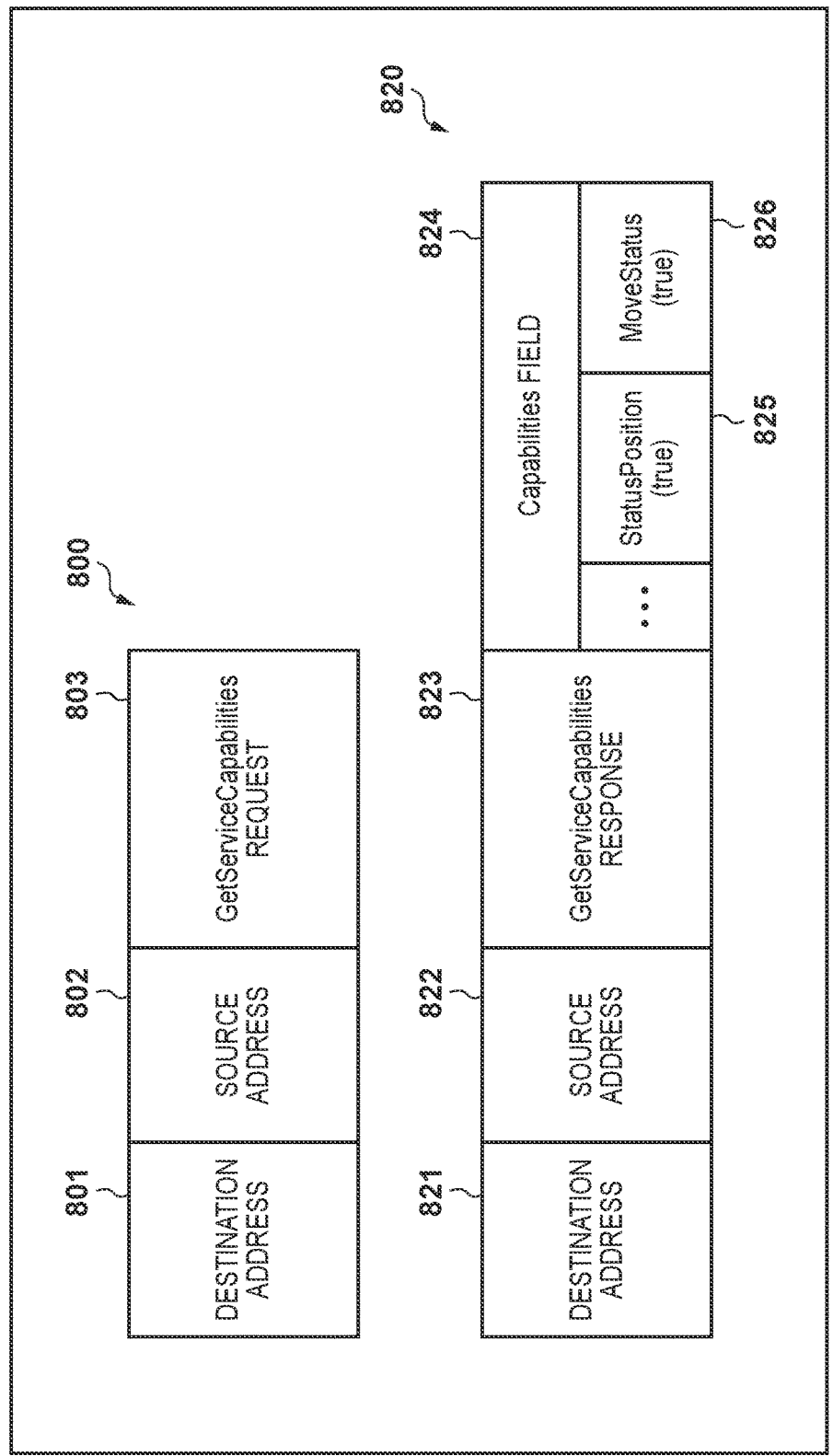

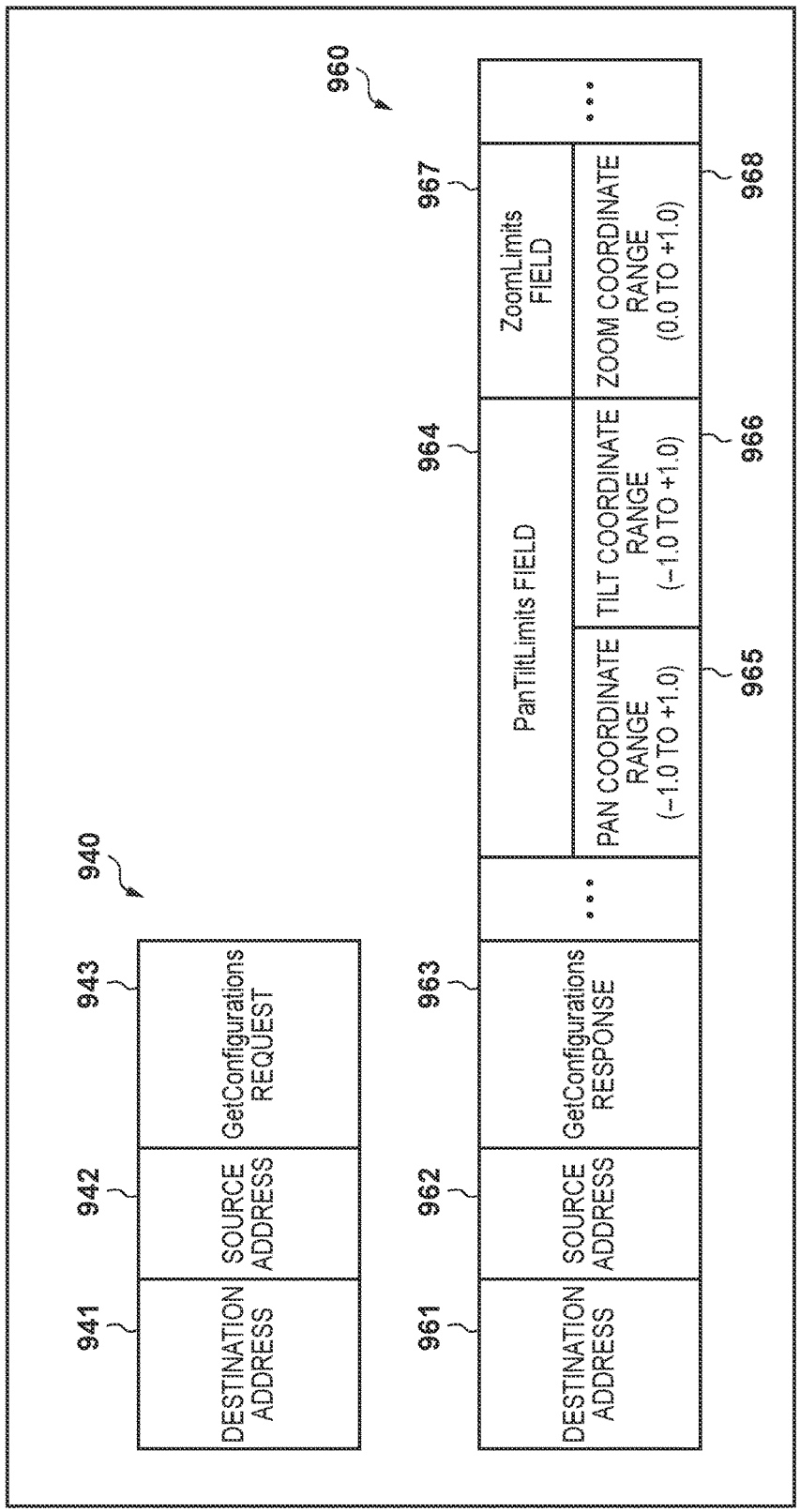

F I G. 10

```
<s:Envelope xmlns:s="http://www.w3.org/2003/05/soap-envelope">
  <s:Header>
    ...
    <a:Action s:mustUnderstand="true">http://www.onvif.org/ver20/ptz/wsdl/GetServiceCapabilities</a:Action>
  </s:Header>
  ...
  <s:Body xmlns:xsi="http://www.w3.org/2001/XMLSchema-instance" xmlns:xsd="http://www.w3.org/2001/XMLSchema">
    <GetServiceCapabilities xmlns="http://www.onvif.org/ver20/ptz/wsdl" />
  </s:Body>
</s:Envelope>
```
— 10A — , 1001

```
<SOAP-ENV:Envelope
  ...
  xmlns:tptz1="http://www.onvif.org/ver20/ptz/wsdl"
  ...>
  <SOAP-ENV:Header>
    ...
  </SOAP-ENV:Header>
  <SOAP-ENV:Body>
    <tptz1:GetServiceCapabilitiesResponse>
      <tptz1:Capabilities GetCompatibleConfigurations="true" Reverse="true" EFlip="false"
         StatusPosition="true" MoveStatus="true" />
      </tptz1:Capabilities>
    </tptz1:GetServiceCapabilitiesResponse>
  </SOAP-ENV:Body>
</SOAP-ENV:Envelope>
```
— 10B — , 1021, 1022, 1023

F I G. 11

11A
```
<s:Envelope xmlns:s="http://www.w3.org/2003/05/soap-envelope">
 <s:Header>
  ...
 </s:Header>
 <s:Body xmlns:xsi="http://www.w3.org/2001/XMLSchema-instance" xmlns:xsd="http://www.w3.org/2001/XMLSchema">
  <GetServices xmlns="http://www.onvif.org/ver10/device/wsdl">
   <IncludeCapability>true</IncludeCapability>
  </GetServices>
 </s:Body>
</s:Envelope>
```
1102      1101

11B
```
<SOAP-ENV:Envelope
...
xmlns:tds="http://www.onvif.org/ver10/device/wsdl" xmlns:tptz="http://www.onvif.org/ver20/ptz/wsdl"
...
>
 <SOAP-ENV:Header>
  ...
 </SOAP-ENV:Header>
 <SOAP-ENV:Body>
  <tds:GetServicesResponse>    ~1111
   ...
   <tds:Service>                                              1112
    <tds:Namespace>http://www.onvif.org/ver20/ptz/wsdl</tds:Namespace>
    <tds:XAddr>http://surveillance.camera.address:80/onvif/ptz_service</tds:XAddr>
    <tds:Capabilities>
     <tptz:Capabilities GetCompatibleConfigurations="true" Reverse="true" EFlip="false"
       StatusPosition="true" MoveStatus="true">
     </tptz:Capabilities>
    </tds:Capabilities>
   ...
                              1114   1115          1113
  </tds:GetServicesResponse>
 </SOAP-ENV:Body>
</SOAP-ENV:Envelope>
```

FIG. 12

```
<s:Envelope xmlns:s="http://www.w3.org/2003/05/soap-envelope">
  <s:Header>
  ...
  </s:Header>
  <s:Body xmlns:xsi="http://www.w3.org/2001/XMLSchema-instance" xmlns:xsd="http://www.w3.org/2001/XMLSchema">
    <GetStatus xmlns="http://www.onvif.org/ver20/ptz/wsdl" />
  </s:Body>
</s:Envelope>
```
12A — 1201

```
<SOAP-ENV:Envelope
...
xmlns:tptz2="http://www.onvif.org/ver10/schema"
xmlns:tptz1="http://www.onvif.org/ver20/ptz/wsdl"
...
>
  <SOAP-ENV:Header>
  ...
  </SOAP-ENV:Header>
  <SOAP-ENV:Body>
    <tptz1:GetStatusResponse>
      <tptz1:PTZStatus>
        <tptz2:Position>
          <tptz2:PanTilt space="http://www.onvif.org/ver10/tptz/PanTiltSpaces/PositionGenericSpace" y="0.0" x="0.0">
          </tptz2:PanTilt>
          <tptz2:Zoom space="http://www.onvif.org/ver10/tptz/ZoomSpaces/PositionGenericSpace" x="0.0">
          </tptz2:Zoom>
        </tptz2:Position>
        <tptz2:MoveStatus>
          <tptz2:PanTilt>UNKNOWN</tptz2:PanTilt>   ~1216
          <tptz2:Zoom>UNKNOWN</tptz2:Zoom>   ~1217
        </tptz2:MoveStatus>
        <tptz2:Error>Initializing</tptz2:Error>   ~1218
        <tptz2:UtcTime>2014-05-02T00:12:46Z</tptz2:UtcTime>   ~1219
      </tptz1:PTZStatus>
    </tptz1:GetStatusResponse>
  </SOAP-ENV:Body>
</SOAP-ENV:Envelope>
```
12B — 1211 1212 1213 1214 1215

FIG. 13

13A
```
<s:Envelope xmlns:s="http://www.w3.org/2003/05/soap-envelope">
 <s:Header>
 ...
 </s:Header>
 <s:Body xmlns:xsi="http://www.w3.org/2001/XMLSchema-instance"
xmlns:xsd="http://www.w3.org/2001/XMLSchema">
  <GetConfigurations xmlns="http://www.onvif.org/ver20/ptz/wsdl" />
 </s:Body>
</s:Envelope>
```
1301

13B
```
<SOAP-ENV:Envelope
...
>
 <SOAP-ENV:Header>
 ...
 <SOAP-ENV:Body>
  <tptz1:GetConfigurationsResponse>          1321
   <tptz1:PTZConfiguration token="0">                1322
...
    <tptz2:PanTiltLimits>
     <tptz2:Range>
      <tptz2:URI>http://www.onvif.org/ver10/tptz/PanTiltSpaces/PositionGenericSpace
      </tptz2:URI>
      <tptz2:XRange>
       <tptz2:Min>-1.000000</tptz2:Min>
       <tptz2:Max>1.000000</tptz2:Max>
      </tptz2:XRange>
      <tptz2:YRange>
       <tptz2:Min>-1.000000</tptz2:Min>
       <tptz2:Max>1.000000</tptz2:Max>
      </tptz2:YRange>
     </tptz2:Range>
    </tptz2:PanTiltLimits>
    <tptz2:ZoomLimits>
     <tptz2:Range>
      <tptz2:URI>http://www.onvif.org/ver10/tptz/ZoomSpaces/PositionGenericSpace
      </tptz2:URI>
      <tptz2:XRange>
       <tptz2:Min>0.000000</tptz2:Min>
       <tptz2:Max>0.800000</tptz2:Max>
      </tptz2:XRange>
     </tptz2:Range>
    </tptz2:ZoomLimits>
    <tptz2:Extension>
...
```
1323

IMAGE CAPTURE APPARATUS, INFORMATION PROCESSING APPARATUS, IMAGE CAPTURE SYSTEM, CONTROL METHODS FOR THE SAME, AND PROGRAM

TECHNICAL FIELD

The present invention relates to an image capture apparatus, an information processing apparatus, an image capture system, control methods for the same, and a program.

BACKGROUND ART

Conventionally, there are known to be image capture apparatuses that change an image capturing direction (pan direction, tilt direction) by causing a camera platform to move, and change an angle of view (zoom position) by causing a zoom lens to move. Also, there are known to be techniques for changing the direction or changing the angle of view for image capture in such an image capture apparatus in accordance with an instruction sent from a client apparatus connected via a network.

Japanese Patent Laid-Open No. 2003-8973 discloses an image capture apparatus that can change the direction of image capture by causing a camera platform to move using a key operation on a mobile phone including a browser function, or a mouse operation on a personal computer. This kind of image capture apparatus can be used in a variety of applications, such as monitoring or TV conferencing, and image capture apparatuses including various camera platforms are used commercially. For example, PTZ cameras, which can cause an image capture unit that captures an image of an object to rotate in a pan direction and a tilt direction and can change the zoom position of the image capture unit, and the like have been used. Hereinafter, changing of the image capturing direction and zoom position will be referred to as changing the image capture position.

In the case of changing the image capture position using a client apparatus, it is desirable that the client apparatus can know, at any time, the state of the image capture position (image capturing direction and zoom position) of the image capture apparatus and the state of a driving mechanism (hereinafter referred to as "PTZ driving mechanism") for changing the image capture position. Also, in the case where a user using the client apparatus cannot change the image capture position of the image capture apparatus as intended, it is desirable that the user can know immediately whether the cause thereof is an abnormality that has occurred in the PTZ driving mechanism, an initializing operation, or the like.

However, with an interface between the image capture apparatus and the client apparatus, there are cases where no consideration is given to performing clear notification of whether the PTZ driving mechanism is in an abnormal state or performing an initialization operation. For example, with the interface standard of the Open Network Video Interface Forum (hereinafter referred to as "ONVIF"), a field called MoveStatus is prepared in order for the image capture apparatus to perform notification of the operation state of the PTZ driving mechanism. However, in the MoveStatus field, only three values are defined, which indicate that the PTZ driving mechanism is performing driving (MOVE), that it is performing driving standby (IDLE), or that it is unclear (other than driving or standby) (UNKNOWN). Accordingly, even if UNKNOWN is described in the MoveStatus field, the client cannot determine right away whether an abnor-mality has occurred in the PTZ driving mechanism, or if the PTZ driving mechanism is in initialization.

SUMMARY OF INVENTION

According to an embodiment of the present invention, an image capture apparatus, an information processing apparatus, an image capture system, control methods for the same, and a program are provided, according to which an external apparatus can easily know whether or not the image capture apparatus is in initialization.

According to one aspect of the present invention, there is provided an image capture apparatus capable of communicating with an external apparatus via a network, the image capture apparatus comprising: change means for changing an image capture position of image capturing means for capturing an image of an object; generating means for, in response to a request received from the external apparatus, generating a response including a first field in which an operation state of the change means is described; and sending means for sending the response to the external apparatus, wherein if the change means is in initialization or has an error, the generating means generates a response that specifies that the change means is in initialization or has an error, using a combination of descriptions in multiple fields, including the first field.

According to another aspect of the present invention, there is provided an information processing apparatus capable of communicating with an image capture apparatus via a network, the information processing apparatus comprising: first query means for sending a request inquiring about a state of the image capture apparatus to the image capture apparatus and receiving a response including a driving state of change means for changing an image capture position of the image capture apparatus, and determining means for determining whether or not the change means is in initialization based on description in a plurality of fields in the response, including a first field in which the driving state is described.

According to another aspect of the present invention, there is provided an image capture system according to which an information processing apparatus and an image capture apparatus can communicate via a network, the image capture system comprising: first sending means for sending a request inquiring about a state of the image capture apparatus from the information processing apparatus to the image capture apparatus; and second sending means for, in response to the request, sending a response, which includes a first field in which an operation state of change means for changing an image capture position of an image capturing means for capturing an image of an object is described, from the image capture apparatus to the information processing apparatus, wherein the image capture apparatus includes generating means for, if the change means is in initialization or has an error, generating the response specifying that the change means is in initialization or has an error using a combination of descriptions in a plurality of fields, including the first field, and the information processing apparatus includes determining means for determining whether or not the change means is in initialization based on the descriptions in the plurality of fields in the response, including the first field in which the operation state is described.

According to another aspect of the present invention, there is provided a control method for an image capture apparatus that has change means for changing an image capture position of image capturing means for capturing an image of an object, and is capable of communicating with an external apparatus via a network, the method comprising: a generating step of, in response to a request received from the external apparatus, generating a response including a first field in which an operation state of the change means is described; and a sending step of sending the response to the external apparatus, wherein in the generating step, if the change means is in initialization or has an error, a response is generated that specifies that the change means is in initialization or has an error using a combination of descriptions in a plurality of fields, including the first field.

According to another aspect of the present invention, there is provided a control method for an information processing apparatus capable of communicating with an image capture apparatus via a network, the method comprising: a first query step of sending a request inquiring about a state of the image capture apparatus to the image capture apparatus and receiving a response including a driving state of change means for changing an image capture position of the image capture apparatus; and a determining step of determining whether or not the change means is in initialization based on descriptions in a plurality of fields in the response, including a first field in which the driving state is described.

According to another aspect of the present invention, there is provided a control method for an image capture system according to which an information processing apparatus and an image capture apparatus can communicate via a network, the method comprising: a first sending step of sending a request inquiring about a state of the image capture apparatus from the information processing apparatus to the image capture apparatus; a second sending step in which, in response to the request, the image capture apparatus sends a response, which includes a first field in which an operation state of change means for changing an image capture position of image capturing means for capturing an image of an object is described, to the information processing apparatus; a generating step in which, if the change means is in initialization or has an error, the image capture apparatus generates the response that specifies that the change means is in initialization or has an error using a combination of descriptions in a plurality of fields, including the first field; and a determining step in which the information processing apparatus determines whether or not the change means is in initialization based on the descriptions in the plurality of fields in the response, including the first field in which the operation state is described.

Further features of the present invention will become apparent from the following description of exemplary embodiments with reference to the attached drawings.

BRIEF DESCRIPTION OF DRAWINGS

FIG. 2A is a diagram showing an example of a hardware configuration of an image capture apparatus.

FIG. 2B is a diagram showing an example of a hardware configuration of a client.

FIG. 3 is a diagram showing an example of a command sequence for a client and an image capture apparatus according to the first embodiment.

FIG. 5 is a flowchart illustrating operations performed by the image capture apparatus according to the first embodiment.

FIG. 6 is a diagram showing an example of a command sequence for the client and the image capture apparatus according to a second embodiment.

FIG. 7 is a flowchart illustrating operations performed by the image capture apparatus according to the second embodiment.

FIGS. 8A and 8B are diagrams showing an example of a data configuration for a command/response according to which the image capture apparatus performs notification of services that can be provided.

FIG. 9B is a diagram showing an example of a data configuration for a command/response for performing notification of a range of motion of a PTZ driving mechanism of the image capture apparatus.

FIG. 10 is a diagram showing an example of a GetServiceCapabilities request/response according to ONVIF.

FIG. 11 is a diagram showing an example of a GetService request/response according to ONVIF.

FIG. 12 is a diagram showing an example of a GetStatus request/response according to ONVIF.

FIG. 13 is a diagram showing an example of a GetConfiguration request/response according to ONVIF.

DESCRIPTION OF EMBODIMENTS

Hereinafter, several preferred embodiments of the present invention will be described with reference to the accompanying drawings. Note that the configurations shown in the embodiments below are merely examples, and the present invention is not limited to the illustrated configurations. Also, a case will be described below in which a communication interface defined by ONVIF is used, but the application of the present invention is not limited to any specific communication interface standard.

First Embodiment

Figure 1A:
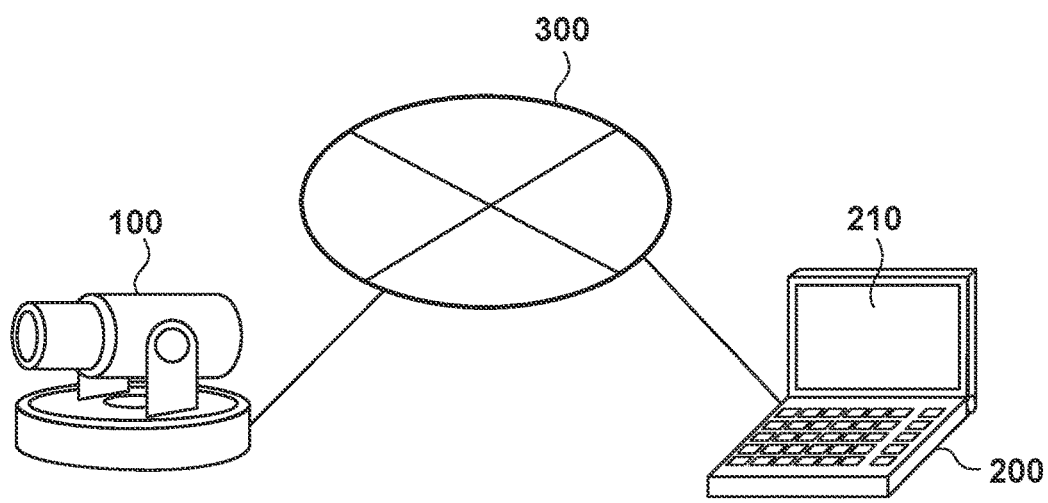
FIG. 1A is a diagram showing an example of a system configuration of an image capture system.

FIG. 1A is a diagram showing an example of a system configuration of an image capture system according to a first embodiment. In the image capture system according to the present embodiment, an image capture apparatus 100 is connected via a network 300 to a client 200, which is an external apparatus. Accordingly, the image capture apparatus 100 can communicate with the client 200 via the network 300. The image capture apparatus 100 transmits captured images to the client 200 via the network 300. Here, the client 200 is an example of an external apparatus, and is constituted by an information processing apparatus, for example. Also, a display unit 210 will be described later with reference to FIG. 2B. Note that the image capture apparatus 100 according to the present invention is a monitoring camera that captures a motion image, and more specifically, it is a network camera used for monitoring, and regarding communication between the image capture apparatus 100 and the client 200, communication defined by ONVIF is executed, for example. Also, the image capture apparatus 100 according to the present embodiment is disposed on a wall surface or a ceiling.

The network 300 is constituted by multiple routers, switches, cables, and the like that satisfy a communication standard such as Ethernet (registered trademark), for example. In the present embodiment, any communication standard, scale, and configuration may be used as long as it is possible to perform communication between the image capture apparatus 100 and the client 200. For example, the network 300 may be constituted by the Internet, a wired LAN (Local Area Network), a wireless LAN, a WAN (Wide Area Network), or the like. Note that the image capture apparatus 100 according to the present embodiment may be compatible with PoE (Power Over Ethernet (registered trademark)), and may receive a supply of power via LAN cable.

The client 200 sends a command to the image capture apparatus 100. For example, the client 200 sends a command (request) to change the image capturing direction or the angle of view of the image capture apparatus 100 using a format defined by ONVIF. Also, the image capture apparatus 100 changes the image capturing direction in response to the command to change the image capturing direction (pan, tilt), which was received from the client 200. Also, the image capture apparatus 100 changes the angle of view in response to a command to change the angle of view (zoom), which was received from the client 200.

Figure 1B:
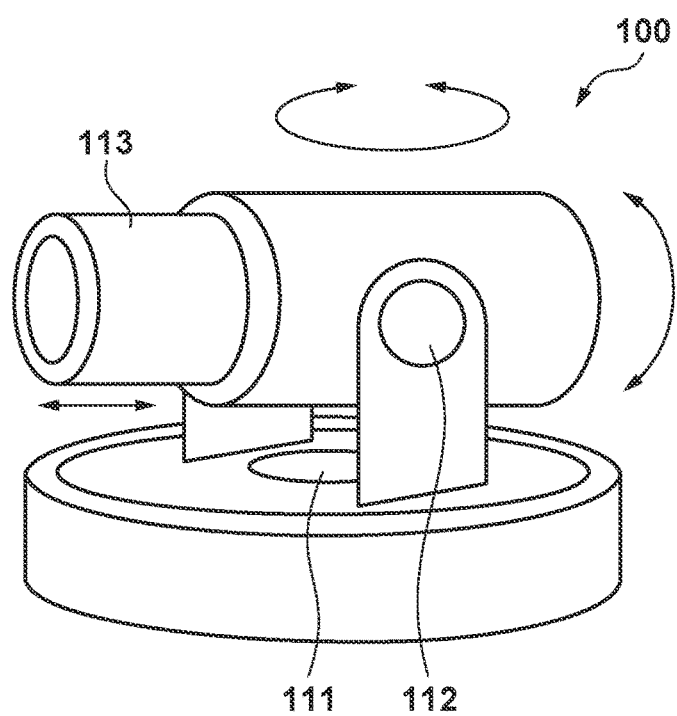
FIG. 1B is a diagram showing an example of a driving mechanism according to which an image capture apparatus changes the image capturing direction or angle of view.

FIG. 1B is a diagram showing an example of a driving mechanism according to which the image capture apparatus 100 according to the present embodiment changes the image capturing direction or angle of view. A pan driving mechanism 111 changes the image capturing direction of the image capture apparatus 100 in the pan direction. Also, a tilt driving mechanism 112 changes the image capturing direction of the image capture apparatus 100 in a tilt direction. Furthermore, a zooming mechanism 113 changes the angle of view of the image capture apparatus 100. That is to say, the pan driving mechanism 111, the tilt driving mechanism 112, and the zooming mechanism 113 constitute a PTZ driving mechanism that changes the image capture position of an image capture unit 103 (FIG. 2A) by respectively changing the pan, tilt, and zoom of the image capture apparatus 100. Note that in the present embodiment, the pan driving mechanism 111, the tilt driving mechanism 112, and the zooming mechanism 113 are each constituted by a stepping motor or a gear.

FIG. 2A is a diagram showing an example of a hardware configuration of the image capture apparatus 100 according to the present embodiment. In FIG. 2A, the control unit 101 performs overall control of the image capture apparatus 100. The control unit 101 is constituted by a CPU (Central Processing Unit) for example, and executes a program stored in a later-described memory 102. Alternatively, the control unit 101 may perform control using hardware.

The memory 102 is used a storage region for data, such as a storage region for programs executed by the control unit 101, a work region for when a program is being executed, and a storage region for captured images generated by the later-described image capture unit 103. Also, the memory 102 stores a coordinate system used for expressing the image capturing direction of the image capture apparatus 100 and a coordinate system used for expressing the angle of view of the image capture apparatus 100. Also, the memory 102 stores a command suspension queue for suspending the execution of commands received by a later-described communication unit 104.

The image capture unit 103 converts an analog signal generated by capturing an image of an object into a digital signal. Also, the image capture unit 103 generates a captured image by performing a data compression process using an ADCT (Adaptive Discrete Cosine Transform) or the like, and outputs the captured image to the memory 102. After outputting a captured image to the memory 102, the image capture unit 103 sends an image obtaining event to the control unit 101. A driving unit 107 has the pan driving mechanism 111, the tilt driving mechanism 112, and the zooming mechanism 113, and drives them in accordance with instructions from an image capture control unit 106 so as to change the image capture position of the image capture apparatus 100. Note that in the present embodiment, the image capture position of the image capture apparatus 100 is determined by the image capturing direction of the image capture apparatus 100, which is determined by the pan driving mechanism 111 and the tilt driving mechanism, and the angle of view of the image capture apparatus 100, which is determined by the zooming mechanism 113. Note that changing the image capture position is not limited to pan, tilt, and zoom, and it may involve changing the position in space of the image capture apparatus 100 itself (e.g., a configuration in which the image capture apparatus 100 is placed on a rail so as to move).

The communication unit 104 connects the image capture apparatus 100 to the network 300 and performs communication with the client 200. For example, the communication unit 104 receives control commands (in the present embodiment, requests that comply with ONVIF, for example) from the client 200 and sends control commands (e.g., responses that comply with ONVIF) to the client 200. A position detection unit 105 detects the coordinates of the pan driving mechanism 111, the tilt driving mechanism 112, and the zooming mechanism 113. If a request for information on the image capturing direction or angle of view is sent from the client 200 to the image capture apparatus 100, the coordinates of the mechanisms are each detected by the position detection unit 105, and the detected coordinates are sent to the client 200 as position information.

The image capture control unit 106 controls the driving unit 107 (pan driving mechanism 111, tilt driving mechanism 112, and zooming mechanism 113) in accordance with an instruction from the control unit 101. That is to say, when the communication unit 104 receives a command to change the image capture position from the client 200, a reception event corresponding to the command is sent to the control unit 101. Upon receiving the reception event, the control unit 101 provides a control instruction to the image capture control unit 106 according to the content of the reception event. After receiving the control instruction, the image capture control unit 106 drives the pan driving mechanism 111, the tilt driving mechanism 112, or the zooming mechanism 113 according to the control instruction.

The internal configuration of the image capture apparatus 100 has been described above, but the processing blocks shown in FIG. 2A illustrate a preferred embodiment of the image capture apparatus according to the present invention and are not limited thereto. Various modifications and changes, such as including an audio input unit, are possible without straying from the gist of the present invention.

Next, the client 200 will be described. FIG. 2B is a diagram showing an example of a hardware configuration of the client 200 according to the present embodiment. The client 200 according to the present embodiment is configured as a computer that is connected to the network 300. The control unit 201 is constituted by a CPU for example, and performs overall control of the client 200 by executing a program stored in a later-described memory 202. Note that the control unit 201 may perform control using hardware.

The memory 202 is used as a storage region for programs executed by the control unit 201, a work region for when a program is being executed, and a storage region for data. The communication unit 204 connects to the network 300 and performs communication with the image capture apparatus 100. The communication unit 204 receives a captured image sent from the image capture apparatus 100, for example. Also, for example, the communication unit 204 sends commands for controlling the image capture apparatus 100 and commands for requesting information of the image capture apparatus 100 via the network 300 to the image capture apparatus 100.

An input unit 205 receives input of an instruction from the user. For example, as the instruction from the user, the input unit 205 can receive input of instructions to send various types of commands to the image capture apparatus 100. Instructions for the image capture apparatus 100 will be described later in detail. Upon receiving input of an instruction to send a command to the image capture apparatus 100 from the user, the input unit 205 notifies the control unit 201 that a command has been input. In response to the instruction input to the input unit 205, the control unit 201 generates a command for the image capture apparatus 100 and performs sending control for sending the generated command to the image capture apparatus 100 via the communication unit 204. Also, the input unit 205 can receive input of a response of a user to an inquiry message to the user or the like, which is generated by the control unit 201 executing a program stored in the memory 202.

The display unit 210 displays a captured image received by the communication unit 204. Also, the display unit 210 can display an inquiry message or the like to the user, which is generated by the control unit 201 executing a program stored in the memory 202.

Next, communication between the image capture apparatus 100 and the client 200 according to the present embodiment, which includes a configuration such as that described above, will be described. FIG. 3 is a diagram for describing a command sequence between the client 200 and the image capture apparatus 100 according to the first embodiment. Specifically, FIG. 3 is a diagram for describing command requests sent by the client 200 to the image capture apparatus 100, and command responses sent by the image capture apparatus 100 to the client 200 in response to the command request. In FIG. 3, in steps S301 and S302, checking of the functions (capabilities) of the image capture apparatus 100 is performed by the client 200, and in steps S303 and S304, the operation state of the image capture apparatus 100 is obtained by the client 200.

Figure 8B:
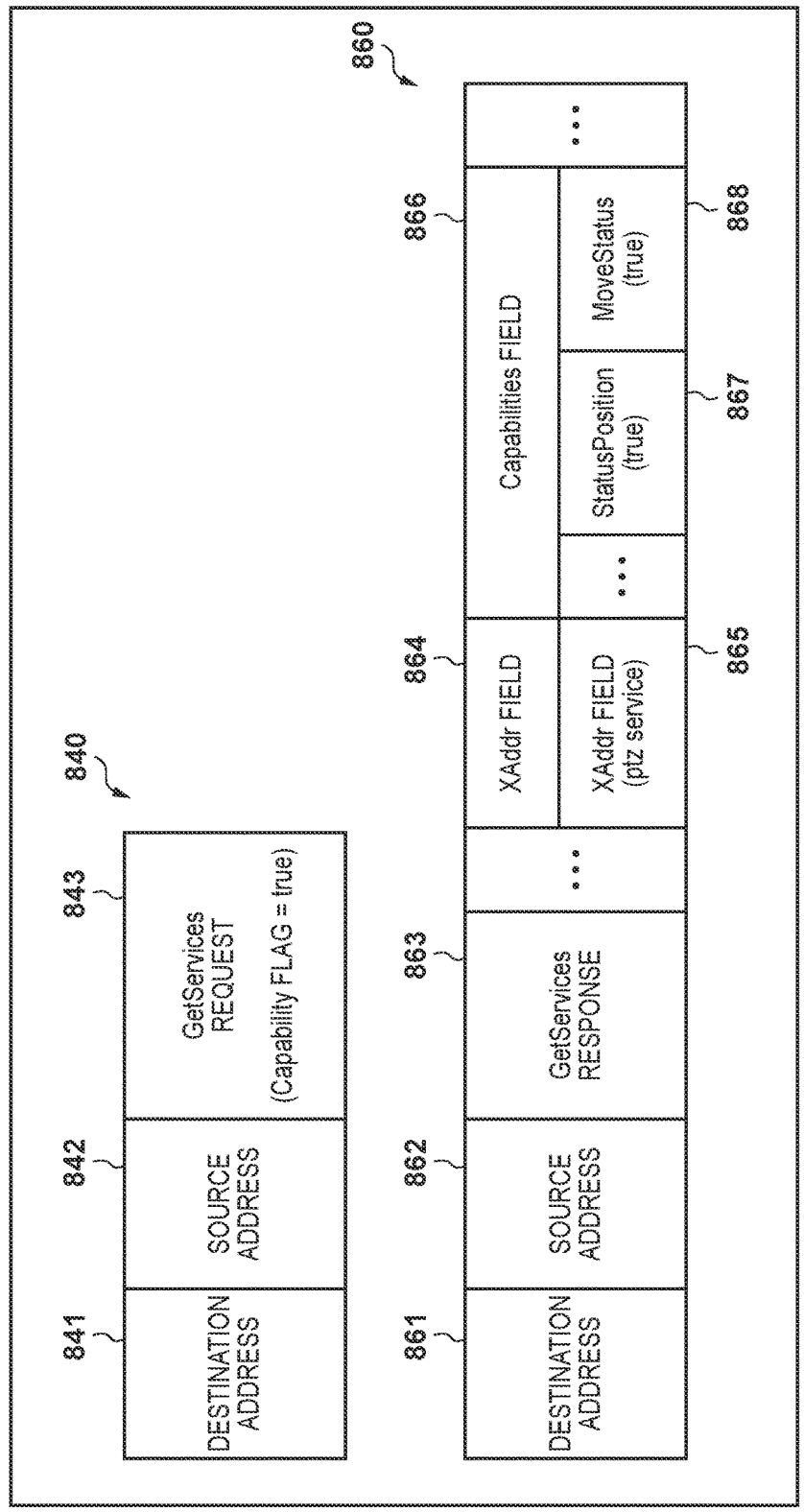
Figure 9A:
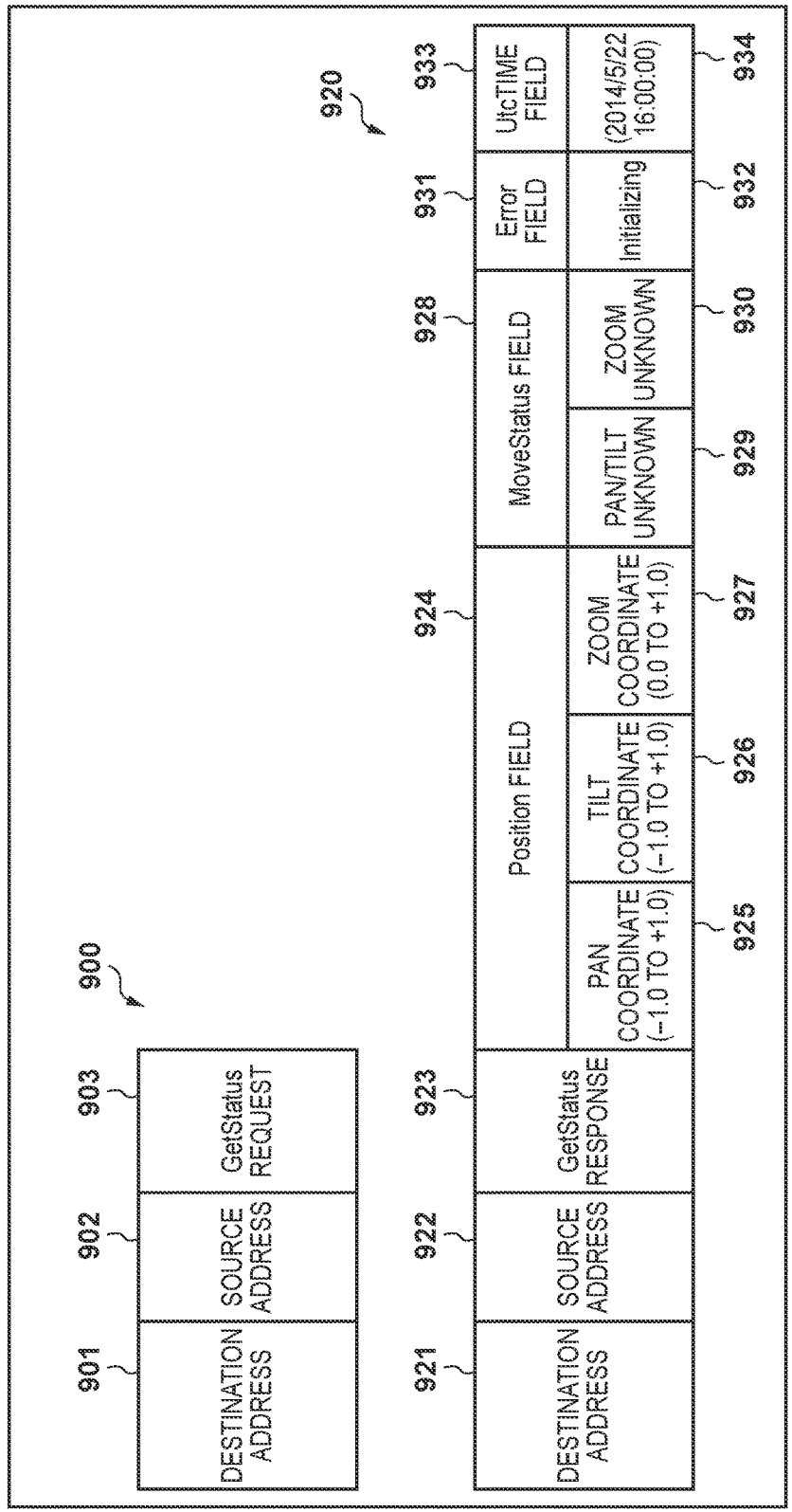
FIG. 9A is a diagram showing an example of a data configuration for a command/response according to which the image capture apparatus performs notification of an operation state.

Also, FIGS. 8A and 9A are diagrams for describing an example of a data configuration of the command requests (GetServiceCapabilities request 800, GetStatus request 900) and command responses (GetServiceCapabilities response 820, GetStatus response 920) used in FIG. 3. A command request includes a destination address 801 or 901 indicating the address of the image capture apparatus 100 that is to be caused to execute the command, and a source address 802 or 902 indicating the address of the client 200, which is the source of the command. Also, a command response has a destination address 821 or 921 that indicates the address of the client 200 that is the send destination of the response (source of the request), and a source address 822 or 922 indicating the address of the image capture apparatus 100, which is the source of the response. Note that fields 803, 823, 903, and 923 specify the command types (GetServiceCapabilities, GetStatus) of the requests and responses.

In step S301, the control unit 201 of the client 200 gives an instruction to the communication unit 204 to send the GetServiceCapabilities request 800 to the image capture apparatus 100. The GetServiceCapabilities request 800 is a command for inquiring about the functions provided by the image capture apparatus 100. In step S302, after receiving the GetServiceCapabilities request 800, the control unit 101 of the image capture apparatus 100 gives an instruction to the communication unit 104 to send the GetServiceCapabilities response 820 to the client 200 as a response. The GetServiceCapabilities response 820 is a response for indicating whether or not the image capture apparatus 100 is compatible with the functions and commands of the present embodiment. In the present embodiment, the capabilities that can be provided by the image capture apparatus 100 are described in the Capabilities field 824. In FIG. 8A, the values of StatusPosition 825 and MoveStatus field 826 are true. This indicates that the image capture apparatus 100 is capable of performing notification of the position and operation state of the PTZ driving mechanism in response to an inquiry about the state thereof from the client (GetStatus request).

In step S303, the control unit 201 gives an instruction to the communication unit 204 to send the GetStatus request 900 to the image capture apparatus 100. The GetStatus request 900 is a command for inquiring about the image capture position of the image capture apparatus 100. Upon receiving the GetStatus request 900, the control unit 101 of the image capture apparatus 100 detects the coordinates of the pan driving mechanism 111, the tilt driving mechanism 112, and the zooming mechanism 113 with the position detection unit 105, and the operation states thereof are detected by the image capture control unit 106. Also, in step S304, the control unit 101 generates the GetStatus response 920, which includes information indicating the detected coordinates of the image capture position and information indicating the operation state of the image capture apparatus 100, and the control unit 101 sends the GetStatus response 920 via the communication unit 104 to the client 200. In this way, in response to receiving an inquiry about capability from the client 200, the image capture apparatus 100 notifies the client 200 that it is possible to perform notification of the image capture position changed by the PTZ driving mechanism and the operation state of the PTZ driving mechanism.

The GetStatus response 920 is a response indicating the current image capturing direction and angle of view (image capture position) of the PTZ driving mechanism of the image capture apparatus 100 and the operation state of the PTZ driving mechanism. Pan coordinate 925, tilt coordinate 926, and zoom coordinate 927, which respectively indicate the current pan position, tilt position, and zoom position of the PTZ driving mechanism, are described in a Position field 924. Also, in a MoveStatus field 928, "MOVE" is described as the state of the PTZ driving mechanism during driving, "IDLE" is described as the state of the PTZ driving mechanism during driving standby, and "UNKNOWN" is described as the state of the PTZ driving mechanism during another state (e.g., an error state or when in initialization). Note that with ONVIF, any of these three values can be described in a pan/tilt field 929 and a zoom field 930 of MoveStatus field 928, but other values cannot be described (stored) therein.

Figure 4:
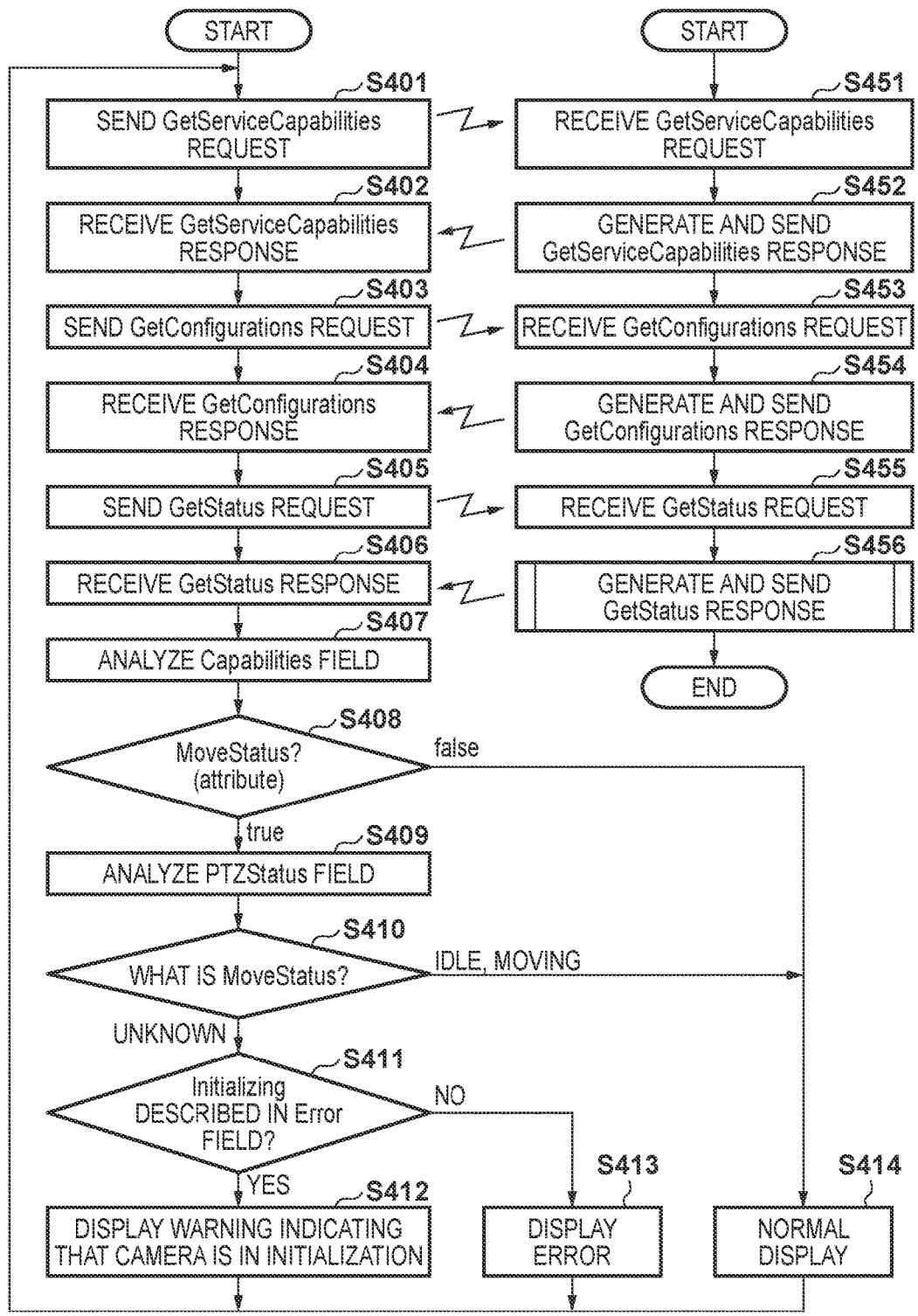
FIG. 4 is a flowchart illustrating operations performed by the client and the image capture apparatus according to the first embodiment.

Next, operations performed by the image capture apparatus 100 and the client 200 according to the first embodiment will be described in further detail with reference to the flowcharts shown in FIGS. 4 and 5. First, the client 200 sends the GetServiceCapabilities request 800 to the image capture apparatus 100 (step S401). Upon receiving the GetServiceCapabilities request 800 from the client 200 (step S451), the image capture apparatus 100 generates the GetServiceCapabilities response 820 and sends it to the client 200 (step S452). The client 200 receives the GetServiceCapabilities response 820 from the image capture apparatus 100 (step S402). The above-described exchange corresponds to steps S301 and S302 in FIG. 3. Subsequent GetConfigurations request/response exchanges (steps S403, S404, S453, S454) can be omitted in the first embodiment. These will be described in a second embodiment.

Thereafter, using the GetStatus request 900, the client 200 can inquire to the image capture apparatus 100 as needed about the image capture position determined by the PTZ driving mechanism and the operation state of the PTZ driving mechanism. That is to say, the client 200 generates the GetStatus request 900 and sends it to the image capture apparatus 100 (step S405). Upon receiving the GetStatus request 900 (step S455), the image capture apparatus 100 generates the GetStatus response 920 and sends it to the client 200, which is the source of the GetStatus request 900 (step S456). The client 200 receives the GetStatus response 920 sent from the image capture apparatus (step S406). Here, in step S456, in response to the GetStatus request sent from the client 200, the image capture apparatus 100 generates a GetStatus response that includes fields in which values indicating the operation state and coordinates of the PTZ driving mechanism are described. Then, the image capture apparatus 100 sends the generated GetStatus response to the client 200. Hereinafter, an example of processing for generating the GetStatus response in the image capture apparatus 100 will be described in further detail.

FIG. 5 is a flowchart illustrating the generation of the GetStatus response 920 in the image capture apparatus 100. The control unit 101 of the image capture apparatus 100 determines whether or not the PTZ driving mechanism is in initialization (step S501). The initialization of the PTZ driving mechanism refers to, for example, an origin return operation of the PTZ driving mechanism, which is executed in accordance with a reset of the apparatus at the time of turning on the power supply of the image capture apparatus 100, or at a time of updating firmware, or the like.

If it is determined that the PTZ driving mechanism is in initialization (YES in step S501), the control unit 101 describes "UNKNOWN" in MoveStatus field 928 (step S502). In the present embodiment, the operation state can be described separately in the pan/tilt field 929 and the zoom field 930, and in step S502, "UNKNOWN" is described in both of them. Then, the control unit 101 describes a specific character string 932, which indicates that the current state is a non-error state, in the Error field 931 (step S503). In the present embodiment, "Initializing" is used as the character string 932, but naturally, there is no limitation to this, and it is sufficient that the character string is defined as non-error. Also, an empty string may be used as the character string 932.

Furthermore, as the pan/tilt position and zoom position, the control unit 101 describes predetermined values in the fields (925 to 927) of the Position field 924 (step S504). The control unit 101 generates the GetStatus response 920, which includes the thus-generated Position field 924, MoveStatus field 928, and Error field 931 (step S513), and sends it to the client 200 (step S514). Note that it is preferable that the predetermined value described in the Position fields 924 are values within a range of change that can be used for pan, tilt, and zoom. This will be described in detail in the second embodiment. Also, a shooting date/time 934 is described in a UtcTime field 933.

As described above, if the PTZ driving mechanism is in initialization, the control unit 101 uses a combination of descriptions in multiple fields including a MoveStatus field to generate and send a response including a description according to which the client 200 can specify that the PTZ driving mechanism is in initialization. For example, one of "MOVE", "IDLE", or "UNKNOWN" is described in the MoveStatus field for the operation state of the PTZ driving mechanism, and it is not possible to indicate that the PTZ driving mechanism is in initialization. In view of this, for example, if the PTZ driving mechanism is in initialization, the control unit 101 describes "UNKNOWN" in the MoveStatus and uses a combination of the descriptions in the MoveStatus and Error fields to generate a response according to which it is possible to specify that the PTZ driving mechanism is in initialization. Note that with ONVIF, referencing the Error field is mandatory if the MoveStatus is "UNKNOWN". Thus, by using a combination of a field in which the operation state is described and a field for which referencing is mandatory, it is possible to more reliably notify the client 200 that the PTZ driving mechanism is in initialization.

If it is determined that the PTZ driving mechanism is not in initialization (NO in step S501), the control unit 101 determines whether or not the PTZ driving mechanism is in an error state (step S505). Specific examples of error states include breakdown of a sensor (position detection, etc.), exceeding the durability time or the durability limit of the driving mechanism, breakdown of the driving mechanism, and the like. If the PTZ driving mechanism is in an error state (YES in step S505), the control unit 101 describes "UNKNOWN" in the MoveStatus field 928 (step S506), similarly to step S502. Then, the control unit 101 describes the character string 932 for specifying the error state in the Error field 931 (step S507). Furthermore, as the pan/tilt position and zoom position, the control unit 101 describes predetermined values in the fields (925 to 927) of the Position field 924 (step S508). Using the thus-generated Position field 924, the MoveStatus field 928, and the Error field 931 when an error occurs, the control unit 101 generates the GetStatus response 920 (step S513) and sends it to the client 200 (step S514).

If the PTZ driving mechanism is neither in initialization nor in an error state, the control unit 101 uses the position detection unit 105 to detect the positions of pan, tilt, and zoom for the PTZ mechanism (step S509). Then, these positions are described in the Position field 924 as a pan coordinate 925, a tilt coordinate 926, and a zoom coordinate 927 (step S510). Also, via the image capture control unit 106, the control unit 101 determines whether or not the driving unit 107 is driving the PTZ mechanism (step S511). Then, if the PTZ mechanism is being driven, the control unit 101 describes the value "MOVE" in the MoveStatus field 928, and if it is in driving standby, the control unit 101 describes the value "IDLE" in the MoveStatus field 928 (step S512). Using the thus-generated Position field 924 and MoveStatus field 928, the control unit 101 generates the GetStatus response 920 (step S513) and sends it to the client 200 (step S514). Note that if UNKNOWN is not described in the MoveStatus field 928, the Error field 931 is not needed.

Returning to FIG. 4, an example of operations performed by the client 200 upon receiving a GetStatus response such as that described above will be described. Upon receiving the GetStatus response from the image capture apparatus 100 (step S406), the control unit 201 of the client 200 determines whether or not the image capture apparatus 100 has a capability of performing notification of the operation state (MoveStatus). That is to say, the control unit 201 analyzes the Capabilities field 824 of the GetServiceCapabilities response 820 received in step S402 (step S407) and determines whether or not the MoveStatus field 826 is true (step S408). If there is no capability of notifying the image capture apparatus 100 of the operation state (if the MoveStatus field 826 is false), the processing moves to step S414, and display relating to the MoveStatus is not performed.

On the other hand, if there is a capability of notifying the image capture apparatus 100 of the operation state (if the MoveStatus field 826 is true), the processing moves to step S409. The control unit 201 analyzes the MoveStatus field 928 of the GetStatus response 920 received in step S406 (step S409). With ONVIF, the MoveStatus field is included in the PTZStatus field, and therefore the PTZStatus field is analyzed. If it is determined as a result of the analysis that "MOVE" or "IDLE" described in the MoveStatus field 928, it is determined that the PTZ driving mechanism is running normally, the processing moves from step S410 to step S414, and normal display is continued.

If "UNKNOWN" is described in the MoveStatus field 928, the processing moves from step S410 to step S411. The control unit 201 obtains the character string 932 described in the Error field 931 of the received GetStatus response 920 and determines whether or not it is a specific character string indicating a state other than an error state ("Initializing" in the present example) (step S411). If the character string 932 of the Error field 931 is the specific character string, that is, "Initializing", the control unit 201 determines that the PTZ driving mechanism is in initialization, and for example, displays a warning on the display unit 210 to the effect that the image capture apparatus 100 is in initialization (step S412). On the other hand, if the character string 932 of the Error field 931 relates to an error, the control unit 201 displays that an error has occurred, and displays the error content obtained from the character string 932 on the display unit 210 (step S413).

As described above, in the first embodiment, the client 200 can immediately determine whether or not the PTZ mechanism of the image capture apparatus 100 is in initialization based on descriptions in multiple fields, including a field that indicates the operation state of the PTZ driving mechanism in the response received from the image capture apparatus 100. For example, if the image capture apparatus 100 and the client 200 perform communication that complies with ONVIF, the client 200 can immediately determine whether or not the PTZ driving mechanism is in initialization based on the descriptions in the MoveStatus field and the Error field.

Examples of descriptions in commands (requests and responses) that comply with ONVIF are shown in FIGS. 10 and 12. FIG. 10 shows an example of descriptions in a GetServiceCapabilities request 10A and an example of descriptions in a GetServiceCapabilities response 10B. A description 1001 in the GetServiceCapabilities request 10A shows that the request is a GetServiceCapabilities request, and corresponds to field 803. Also, a notification of capabilities that can be provided by the image capture apparatus 100 is described in a description 1021 in the GetServiceCapabilities response 10B. Descriptions 1022 and 1023 correspond to the StatusPosition 825 and MoveStatus field 826 respectively.

FIG. 12 shows an example of descriptions in a GetStatus request 12A and an example of descriptions in a GetStatus response 12B. A description 1201 in the GetStatus request 12A indicates that the request is a GetStatus request, and corresponds to the field 903. A description 1211 is a description of the main portion of the GetStatus response. A description 1212 is a field in which a value that indicates the image capture position according to the PTZ driving mechanism is described, and corresponds to the Position field 924. A description 1213 describes the coordinates for pan/tilt, and description 1214 describes the coordinate for zoom, and these correspond to the pan coordinate 925, tilt coordinate 926, and zoom coordinate 927. A description 1215 is a description that corresponds to the MoveStatus field 928, which indicates the operation state of the PTZ driving mechanism, and descriptions 1216 and 1217 correspond to fields 929 and 930 respectively. A description 1218 is a description that corresponds to the Error field 931, and in the example shown here, "Initializing" is described. A description 1219 is an example of a description that corresponds to the UtcTime field 933 (time of sending GetStatusResponse).

Note that in the above-described first embodiment, a case has been described in which MoveStatus and StatusPosition are both true in GetServiceCapabilities and notification of the operation state of PTZ and image capture position can be performed, but there is no limitation to this. It is possible for the MoveStatus to be true and the StatusPosition to be false. In such a case, the Position field is not needed in the GetStatus response.

Also, with ONVIF, when the image capture apparatus uses GetServiceCapabilities to send a response to the effect that it has a capability of performing notification of the operation state of the PTZ driving mechanism and the image capture position, MoveStatus and Position are mandatory, in contrast to the case of the GetStatus request. That is to say, notification of MoveStatus needs to be performed even if the image capture apparatus 100 is in initialization, but no value indicating that the image capture apparatus 100 is in initialization is defined in MoveStatus. According to the first embodiment, even if no value indicating that the PTZ driving mechanism is in initialization is thus prepared, it is possible to clearly notify the client 200 that the PTZ driving mechanism is in initialization.

Note that if it is possible to perform description in the pan/tilt field 929 and the zoom field 930 in the MoveStatus field 928, the information corresponding to the fields may be written in the Error field 931. Also, information obtained in consideration of each of these may be written therein. Specifically, if pan/tilt is in an initialization state and zoom is in an error state, information relating to each may be written in the Error field 931, and if any one of them is in an error state, information indicating the error state may be written therein.

Second Embodiment

In the first embodiment, in the case of being in initialization, none of the coordinate values of the Position field in the Get Status response are defined in particular. As described above, with communication that complies with ONVIF, if the client 200 is notified that the image capture apparatus 100 has a capability of performing notification of the image capture position, notification of the image capture position is mandatory in response to a subsequent GetStatus request. However, if an extreme value (value that normally cannot be used) is described in the Position field 924 due to initialization being in progress, the client 200 may be adversely influenced upon analyzing this information. In the second embodiment, if the PTZ driving mechanism is in initialization, the numeric value described in the Position field 924 is defined. That is to say, in the second embodiment, if the PTZ driving mechanism is in initialization, predetermined values within a range of change performed by the PTZ driving mechanism for pan, tilt, and zoom are described in the Position field 924. Accordingly, a case is prevented in which the client 200 is notified of an unexpected value.

FIG. 6 is a diagram for describing a command sequence between the client 200 and the image capture apparatus 100 according to the second embodiment. That is to say, FIG. 6 is a diagram for describing command requests sent by the client 200 to the image capture apparatus 100, and command responses sent by the image capture apparatus 100 in response to the client 200. In FIG. 6, in steps S601 and S602, checking of the functions (capabilities) of the image capture apparatus 100 is performed by the client 200. Steps S603 and S604 will be described later. In steps S605 and S606, the client 200 obtains the PTZ position and operation state of the PTZ driving mechanism of the image capture apparatus 100. The content of the commands/responses exchanged in steps S601, S602, S604, and S605 are similar to those of steps S301, S302, S303, and S304.

In steps S603 and S604, the client 200 checks the range of motion of the PTZ driving mechanism of the image capture apparatus 100, or in other words, checks the range of changing pan, tilt, and zoom, by which the image capture position is determined. This checking is performed using a GetConfigurations request 940 and a GetConfigurations response 960 such as those shown in FIG. 9B. In step S603, the control unit 201 of the client 200 gives an instruction to the communication unit 204 to send the GetServiceCapabilities request 940 to the image capture apparatus 100. The GetConfigurations request 940 has a destination address 941 that indicates the address of the image capture apparatus 100 that is to be caused to execute the command, and a source address 942 that indicates the address of the client 200, which is the source of the command. "GetConfigurations", which indicates the type of request, is described in a field 943.

In step S604, after receiving the GetConfigurations request 940, the control unit 101 of the image capture apparatus 100 gives an instruction to the communication unit 104 to send the GetConfigurations response 960 to the client 200. The GetConfigurations response 960 has a destination address 961 that indicates the address of the client 200 that is the destination of the response, and a source address 962 that indicates the address of the image capture apparatus 100, which is the source of the response. Information indicating the type of the response is described in a field 963. Also, in the GetConfigurations response 960, a pan coordinate range 965 and tilt coordinate range 966 corresponding to the range of motion for pan and tilt are described in a PanTiltLimits field 964. Furthermore, a zoom coordinate range 968 corresponding to the range of motion for zoom is described in a ZoomLimits field 967. In the present embodiment, values obtained by normalization with −1 to +1 as the range of motion are used for the ranges of motion.

Next, operations performed by the image capture apparatus 100 and the client 200 according to the second embodiment will be described in further detail with reference to the flowcharts shown in FIGS. 4 and 7. First, similarly to the first embodiment, the client 200 obtains capabilities that can be provided by the image capture apparatus 100. That is to say, the client 200 sends the GetServiceCapabilities request 800 so as to receive the GetServiceCapabilities response 820 from the image capture apparatus 100 (steps S401, S402, S451, S452). Next, the control unit 201 of the client 200 checks the range of motion (range of coordinates that can be used for pan, tilt, and zoom) of the PTZ driving mechanism of the image capture apparatus 100. That is to say, the control unit 201 sends the GetConfigurations request 940 via the communication unit 204 to the image capture apparatus 100 (step S403). Upon receiving the GetConfigurations request 940 (step S453), the control unit 101 of the image capture apparatus 100 obtains the coordinate range indicating the range of motion of the PTZ driving mechanism (pan, tilt, zoom) from the image capture control unit 106. Then, using the obtained coordinate range of the PTZ driving mechanism, the control unit 101 generates the GetConfigurations response 960 and sends it to the client 200 via the communication unit 104 (step S454). The client 200 receives the GetConfigurations response (step S404).

Thereafter, using the GetStatus request 900, the client 200 can inquire to the image capture apparatus 100 as needed about the image capture position determined by the PTZ driving mechanism and the operation state. Similarly to the first embodiment, the client 200 generates the GetStatus request 900 and sends it to the image capture apparatus 100 (step S405). Upon receiving the GetStatus request 900 (step S455), the image capture apparatus 100 generates the GetStatus response 920 and sends it to the client 200, which is the source of the GetStatus request 900 (step S456). The client 200 receives the GetStatus response 920 (step S406).

FIG. 7 is a flowchart illustrating a process for generating the GetStatus response 920 in the image capture apparatus 100 according to the second embodiment. If it is determined that the PTZ driving mechanism is in initialization (YES in step S701), the control unit 101 describes "UNKNOWN" in MoveStatus field 928 (step S702). Similarly to the first embodiment, "UNKNOWN" is described in both the pan/tilt field 929 and the zoom field 930. Also, the control unit 101 describes a character string 932 for specifying that the current state is not an error state in the Error field 931 (step S703). In the present embodiment, "Initializing" is used as the character string 932.

Next, the control unit 101 checks whether or not the origin position of the PTZ driving mechanism has been set (step S712). The setting of the origin position is a return (origin return) to the origin position (home position). The origin position (home position) is a basic position set by the user according to the device settings and is a shooting position (and zoom position) that is automatically returned to in the case where, for example, the PTZ driving mechanism is not being operated. For example, in the case of monitoring an entryway, the direction in which the image capture apparatus faces the entryway is usually set as the home position. Normally, the home position is the shooting position that can be set by the user (similarly to a preset position). If the origin position of the PTZ driving mechanism has been set, or in other words, if origin return is complete (YES in step S712), the control unit 101 describes the origin position in the Position field 924 (step S713). On the other hand, if the origin position has not been set (NO in step S712), the control unit 101 describes a predetermined value in the Position field 924 (step S714). Note that a value indicating a specific coordinate value (e.g., origin coordinates for the position of pan, tilt, and zoom in the coordinate system), a value in the center of the range of motion, or a value determined in advance (i.e., a value in the range of motion) can be used as the predetermined value. Note that the value in the center of the range of motion is 0.0 in the case where the coordinate range consists of normalized coordinate values from −1.0 to +1.0. Also, a position set by the manufacturer at the time of shipping, which is the position at the time of placing the product at a normal position (an orientation that is the same as that shown in a product catalog or the like), may be used as the origin coordinates. Thereafter, using the MoveStatus field 928, the Error field 931, and the Position field 924, which were generated in the manner described above, the control unit 101 generates the GetStatus response 920 (step S715). Then, the control unit 101 sends the GetStatus response 920 to the client 200 via the communication unit 104 (step S716).

Processing in the case where an error occurs in the PTZ driving mechanism and processing in the case of being neither in initialization nor in an error state are similar to that of the first embodiment. That is to say, the operations in steps S704 to S711 are similar to those in steps S505 to S512. Also, the operations performed by the client 200 upon receiving the GetStatus response sent in step S716 is the same as in the first embodiment (steps S407 to S414 in FIG. 4). The client 200 is not notified of an unanticipated value even if the PTZ driving mechanism is in initialization, and stable operations can be realized easily. In particular, in the above-described embodiment, since the value in the range of motion that was notified using the GetConfigurations response is described even if initialization is being performed, stable operations can be provided more reliably. Note that in the present embodiment, MoveStatus may be false in the GetServiceCapabilities response. In such a case, notification of the MoveStatus in the GetStatus response is not necessary.

An example of descriptions that comply with ONVIF will be shown in FIG. 13 for the GetConfigurations commands (request and response) shown in FIG. 9B. FIG. 13 shows an example of descriptions in a GetConfigurations request 13A and an example of descriptions in a GetConfigurations response 13B. A description 1301 in the GetConfigurations request 13A shows that the request is GetConfigurations, and corresponds to field 943. Also, a description 1321 in the GetConfigurations response 13B shows that the response is GetConfigurations, and corresponds to field 963. A description 1322 describes a value indicating the range of coordinates that can be used for pan and tilt, and corresponds to the PanTiltLimits field 964. A description 1323 describes a value indicating the range of coordinates that can be used for zoom, and corresponds to the ZoomLimits field 967.

Also, in the above-described embodiment, an example was shown in which GetServiceCapabilities of the PTZ service of ONVIF is used in order for the client 200 to check the functions (capabilities) of the image capture apparatus 100 (steps S301, S302, S601, and S602). However, the mode of capability notification is not limited thereto. For example, with ONVIF, it is possible to use a GetService command according to a DeviceManagement service to inquire about whether or not the image capture apparatus 100 has a capability of performing notification of the shooting position and operation state determined by the PTZ driving mechanism. That is to say, in the above-described embodiment, a GetService request and response can be used instead of a GetServiceCapabilities request and response.

An example of a data configuration of GetService commands (request/response) will be shown in FIG. 8B. The GetService request 840 sent from the client 200 has a destination address 841 for the request, a source address 842 for the request, and a field 843 that indicates that the request is GetService. Also, the GetService response 860 sent as a response by the image capture apparatus 100 has a destination address 861 for the response destination, a source address 862 for the response source, and a field 863 that indicates that the response corresponds to GetService. Also, a ptz service address 865 is described in an XAddr field 864 of the GetService response 860. Note that XAddr is the address of a service provided by the image capture apparatus 100. In order to control the image capture apparatus 100, the client 200 issues a command (defined by the service) to that address. XAddr is normally designated by a character string in a URI format.

If the image capture apparatus 100 has a capability of performing notification of the image capture position and the operation state determined by the PTZ driving mechanism, the values of the StatusPosition 867 and the MoveStatus field 868 are true in the Capabilities field 866. Based on the values of the StatusPosition 867 and the MoveStatus field 868, the client 200 can determine whether or not there is a capability of performing notification of the image capture position and the operation state. For example, in step S408 in FIG. 4, the value of the MoveStatus field 868 can be referenced. Note that in the case of complying with ONVIF, the Capability flag needs to be set to true in the GetService request in order to obtain information on capabilities, such as MoveStatus and PositionStatus, from the image capture apparatus 100 in the GetService response.

An example of descriptions in a GetService command (request, response) that complies with ONVIF is shown in FIG. 11. FIG. 11 shows an example of descriptions in a GetService request 11A and an example of descriptions in a GetService response 11B. A description 1101 in the GetService request 11A shows that the request is GetService, and corresponds to field 843. Note that the description 1102 shows that the Capability flag is true. A description 1111 in the GetService response 11B shows that the response is GetService, and corresponds to the field 863. A description 1112 corresponds to the XAddr field 864. A description 1113 corresponds to the Capabilities field 866. Descriptions 1114 and 1115 correspond to fields 867 and 868 respectively, and show that the capability of performing notification of the image capture position and the capability of performing notification of the operation state of the PTZ driving mechanism are present (StatusPosition=true, MoveStatus=true).

Also, in the embodiments described above, the image capture apparatus 100 is configured to include the pan driving mechanism 111, the tilt driving mechanism 112, and the zooming mechanism 113 as a change unit for changing the image capture position, but there is no limitation thereto. For example, the image capture apparatus 100 may be configured to include, as the change unit for changing the image capture position, a so-called digital PTZ function of changing a region for trimming the captured image (mask region) so as to change the image capture position displayed by the client 200. It is evident that control such as that described above can be applied to this kind digital PTZ function as well.

Also, FIGS. 10 to 13 show that the requests and responses shown in FIGS. 8A, 8B, 9A, and 9B are described using XML based on the ONVIF standard, but the communication standard and description language are not limited thereto. Also, in the embodiments described above, the image capture apparatus 100 and the client 200 may be configured to store commands defined by XML in memories (memory 102 and memory 202) in a file format.

As described above, according to the above-described embodiments, an external apparatus can know that an image capture apparatus is in initialization even if a value indicating that the image capture apparatus is in initialization is not defined in a field prepared for the image capture apparatus to notify the external apparatus of the operation state.

Preferred embodiments of the present invention have been described above, but the present invention is not limited to these embodiments, and various modifications and changes are possible without straying from the gist thereof.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-104718, filed May 20, 2014, which is hereby incorporated by reference herein in its entirety.

The invention claimed is:

1. An image capture apparatus capable of communicating with an external apparatus via a network, the image capture apparatus comprising:
a motorized position changer, which changes an image capture position of an image capturing unit that captures an image of an object;
a controller, which generates, in response to a request received from the external apparatus, a response including a first field in which an operation state of the position changer is described; and
a communicator, which sends the response to the external apparatus,
wherein, in a case where the position changer is in an initialization procedure or has an error, the response generated by the controller specifies that the position changer is in the initialization procedure or has an error, using a combination of descriptions in multiple fields including the first field.

2. The apparatus according to claim 1, wherein
the first field includes a description indicating that the position changer is in one of three states, namely a driving state, a driving standby state, and another state, and
in a case where the position changer is in the initialization procedure, the controller performs a description indicating the other state in the first field.

3. The apparatus according to claim 2, wherein
in the case where the position changer is in the initialization procedure, the controller performs the description indicating the other state in the first field, performs a predetermined description in a second field, and specifies that the position changer is in the initialization procedure using a combination of the description indicating the other state in the first field and the predetermined description in the second field.

4. The apparatus according to claim 3, wherein
the second field is a field that is referenced in a case where a description indicating the other state has been performed in the first field.

5. The apparatus according to claim 3, wherein
in the case where the position changer is in the initialization procedure, the controller describes a specific character string in the second field.

6. The apparatus according to claim 5, wherein
the specific character string is a character string or an empty string defined in advance for indicating a non-error state.

7. The apparatus according to claim 3, wherein
communication with the external apparatus is communication defined by ONVIF (Open Network Video Interface Forum), and
the first field is a MoveStatus field, and the second field is an Error field.

8. The apparatus according to claim 1, wherein
the communicator, in response to receiving an inquiry from the external apparatus about capability that can be provided by the image capture apparatus, sends an indication that notification of the operation state of the position changer can be provided.

9. The apparatus according to claim 8, wherein
communication with the external apparatus is communication defined by ONVIF (Open Network Video Interface Forum), and
the inquiry about capability is a GetServiceCapabilities request or a GetService request, and the indication is a GetServiceCapabilities response or a GetService response.

10. An information processing apparatus capable of communicating with an image capture apparatus via a network, the information processing apparatus comprising:
a first query communicator, which sends a request inquiring about a state of the image capture apparatus to the image capture apparatus and receives a response including a driving state of a position changer, which changes an image capture position of the image capture apparatus, and
a determiner, which determines whether or not the position changer is in the initialization procedure based on descriptions in a plurality of fields in the response, including a first field in which the driving state is described.

11. The apparatus according to claim 10, wherein
in a case where the first field indicates another state, which is neither a driving state nor a driving standby state, determiner determines whether or not the position changer is in the initialization procedure based on the descriptions in the plurality of fields.

12. The apparatus according to claim 11, wherein in the case where the first field indicates the other state, the determiner determines whether or not the position changer is in the initialization procedure based on a description in a second field.

13. The apparatus according to claim 12, wherein
in a case where the first field indicates the other state and a specific character string is described in the second field, the determiner determines that the position changer is in the initialization procedure.

14. The apparatus according to claim 13, wherein
the specific character string is a character string or an empty string defined in advance for indicating a non-error state.

15. The apparatus according to claim 12, wherein
communication with the external apparatus is communication defined by ONVIF (Open Network Video Interface Forum), and
the first field is a MoveStatus field, and the second field is an Error field.

16. The apparatus according to claim 10, further comprising:
a second query communicator, which inquires about capability that can be provided by the image capture apparatus and receives notification of the capability of the image capture apparatus; and
a controller, which causes the determiner to perform a determination in a case where the received notification indicates a capability of sending an indication of a driving state of the position changer.

17. The apparatus according to claim 16, wherein
communication with the external apparatus is communication defined by ONVIF (Open Network Video Interface Forum), and
in the second query communicator, the inquiry about capability is a GetServiceCapabilities request or a GetService request, and the indication is a GetServiceCapabilities response or a GetService response.

18. An image capture system in which an information processing apparatus and an image capture apparatus are capable of communicating via a network, the image capture system comprising:
a first communicator, which sends a request inquiring about a state of the image capture apparatus, from the information processing apparatus to the image capture apparatus; and
a second communicator, which sends, in response to the request, a response, which includes a first field in which an operation state of a position changer that changes an image capture position of an image capturing unit that captures an image of an object is described, from the image capture apparatus to the information processing apparatus,
wherein the image capture apparatus includes a controller, which generates, in a case where the position changer is in an initialization procedure or has an error, the response specifying that the position changer is in the initialization procedure or has an error using a combination of descriptions in a plurality of fields including the first field,
wherein the information processing apparatus includes a determiner, which determines whether or not the position changer is in the initialization procedure based on the descriptions in the plurality of fields in the response, including the first field in which the operation state is described.

19. A control method for an image capture apparatus that includes a position changer that changes an image capture position of an image capturing unit that captures an image of an object, and is capable of communicating with an external apparatus via a network, the method comprising steps of:
generating, in response to a request received from the external apparatus, a response including a first field in which an operation state of the position changer is described; and
sending the response to the external apparatus,
wherein, in the generating step, in a case where the position changer is in an initialization procedure or has an error, the response generated in the generating step specifies that the position changer is in the initialization procedure or has an error, using a combination of descriptions in a plurality of fields including the first field.

20. A control method for an information processing apparatus capable of communicating with an image capture apparatus via a network, the method comprising steps of:
sending a request inquiring about a state of the image capture apparatus to the image capture apparatus;
receiving, in response to the request, a response including a driving state of a position changer that changes an image capture position of the image capture apparatus; and
determining whether or not the position changer is in an initialization procedure based on descriptions in a plurality of fields in the response, including a first field in which the driving state is described.

21. A control method for an image capture system in which an information processing apparatus and an image capture apparatus are capable of communicating via a network, the method comprising steps of:
sending, by the information processing apparatus, a request inquiring about a state of the image capture apparatus to the image capture apparatus;
sending, by the image capture apparatus, in response to the request, a response, which includes a first field in which an operation state of a position changer that changes an image capture position of an image capturing unit that captures an image of an object is described, to the information processing apparatus;
generating, by the image capture apparatus, in a case where the position changer is in an initialization procedure or has an error, the response that specifies that the position changer is in the initialization procedure or has an error using a combination of descriptions in a plurality of fields including the first field; and
determining, by the information processing apparatus, whether or not the position changer is in the initialization procedure based on the descriptions in the plurality of fields in the response, including the first field in which the operation state is described.

22. A non-transitory computer-readable storage medium storing a program for causing a computer to perform a control method for an image capture apparatus that includes a position changer that changes an image capture position of an image capturing unit that captures an image of an object, and is capable of communicating with an external apparatus via a network, the method comprising steps of:
generating, in response to a request received from the external apparatus, a response including a first field in which an operation state of the position changer is described; and
sending the response to the external apparatus,
wherein, in the generating step, in a case where the position changer is in an initialization procedure or has an error, the response generated in the generating step specifies that the position changer is in the initialization procedure or has an error, using a combination of descriptions in a plurality of fields including the first field.

23. A non-transitory computer-readable storage medium storing a program for causing a computer to perform a control method for an information processing apparatus capable of communicating with an image capture apparatus via a network, the method comprising steps of:

sending a request inquiring about a state of the image capture apparatus to the image capture apparatus;

receiving, in response to the request, a response including a driving state of a position changer that changes an image capture position of the image capture apparatus; and determining whether or not the position changer is in an initialization procedure based on descriptions in a plurality of fields in the response, including a first field in which the driving state is described.

* * * * *